(12) United States Patent
Takizawa et al.

(10) Patent No.: US 6,527,392 B1
(45) Date of Patent: Mar. 4, 2003

(54) LIGHT SOURCE APPARATUS, LIGHT SOURCE LAMP UNIT AND PROJECTOR

(75) Inventors: Takeshi Takizawa, Shiojiri (JP); Shinji Haba, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/257,526

(22) Filed: Feb. 25, 1999

(30) Foreign Application Priority Data

Feb. 26, 1998 (JP) .......................................... 10-046041
Aug. 11, 1998 (JP) .......................................... 10-227183

(51) Int. Cl.$^7$ ............................................. G03B 21/26
(52) U.S. Cl. ...................................................... 353/34
(58) Field of Search ............................... 353/31, 33, 34, 353/37, 30, 74, 78, 94, 98, 99, 122; 359/584; 362/368, 296, 350, 341, 538, 549, 396; 396/200

(56) References Cited

U.S. PATENT DOCUMENTS

| | | | |
|---|---|---|---|
| 3,761,170 A | * 9/1973 | Genesky et al. | 353/85 |
| 4,129,365 A | * 12/1978 | Aversano et al. | 353/99 |
| 5,146,248 A | * 9/1992 | Duwaer et al. | 353/122 |
| 5,467,207 A | * 11/1995 | Forkner et al. | 359/40 |
| 5,587,626 A | * 12/1996 | Parham et al. | 313/634 |
| 5,676,442 A | * 10/1997 | Fujimori | 353/119 |
| 5,772,166 A | * 6/1998 | Adams | 248/231.81 |
| 5,945,776 A | * 8/1999 | Koster et al. | 313/113 |
| 5,975,703 A | * 11/1999 | Holman et al. | 353/20 |

* cited by examiner

*Primary Examiner*—N. Le
*Assistant Examiner*—Etienne P LeRoux
(74) *Attorney, Agent, or Firm*—Oliff & Berridge, PLC

(57) ABSTRACT

The invention provides a light source device which can positively arrange a light source lamp at a predetermined position on an optical axis. To this end, the invention provides an alignment reference surface on a reflector to which the light source lamp is attached. More specifically, a light source device of the invention comprises a light source lamp, and a reflector for reflecting light emitted from the light source lamp, the light source lamp being attached to the reflector, wherein an alignment reference surface for aligning and mounting the light source lamp is formed on the reflector. According to the invention, the light source device can be assembled by mounting the light source lamp apart from the alignment reference surface by a predetermined distance with respect to, for example, the X-axis, Y-axis, and Z-axis, respectively. That is, in mounting the light source lamp to the reflector, it is possible to assemble the light source device without fine adjustment of the mounting position of the light source lamp while the light source lamp is lit.

18 Claims, 12 Drawing Sheets

LIGHT SOURCE APPARATUS, LIGHT SOURCE LAMP UNIT AND PROJECTOR

BACKGROUND OF THE INVENTION

1. Field of the Invention

The present invention relates to a light source device comprising a light source lamp for use in, for example, an optical device, to a light source lamp unit comprising the light source device, and to a projection display device comprising the light source lamp unit.

2. Description of Related Art

These days, research and development of projection display devices for use in, for example, personal computers, for enlarging and projecting images is popular.

In such projection display devices, light emitted from a light source lamp is reflected by a reflector, the emitted light is modulated by a light valve, such as a liquid crystal panel, based on image signals, and a modulated-light image is enlarged and projected by a projection lens or the like onto a projection surface.

In a conventional projection display device, a light source device is composed of a light source lamp and a substantially conical reflector having the light source lamp attached to the axis thereof, and a light source lamp unit is composed of the light source device and a lamp housing for detachably mounting the light source device. The light source lamp unit is arranged inside a casing of the projection display device together with the light valve, the projection lens, etc.

In the projection display device having the configuration as described above, in order to efficiently use the luminous flux, the light source lamp is accurately positioned on a focal point of the reflector when the light source lamp is mounted in the casing, and the reflector having the light source lamp attached thereto is positioned so as to correspond to the lamp housing on the optical axis.

However, when assembling the light source lamp unit, the light source lamp has been conventionally positioned and fixed to the reflector at the brightest position with the light source lamp lit, in other words, at a position where parallel light is emitted, and then the light source device is mounted to the lamp housing by springs, etc.

In this case, as described above, while the light source lamp is positioned relative to the inner surface (substantially conical reflection surface) of the reflector, it is not positioned relative to the outer periphery of the reflector. In addition, the light source device is incorporated in the lamp housing by pressing the outer periphery of the reflector by a fixing member, such as a spring, to the lamp housing.

In other words, the light source lamp is positioned relative only to the inner surface of the reflector, and is not positioned relative to the outer periphery of the reflector and the lamp housing. Thus, when the lamp housing is mounted in the casing, the position of the light source lamp varies to the designed optical axis, resulting in the problem of a reduction in illuminance at the projection screen, or of illumination non-uniformity.

SUMMARY OF THE INVENTION

It is an object of the present invention to provide a light source device which can positively arrange a light source lamp at a predetermined position on an optical axis, and to a light source lamp unit and a projection display device.

To this end, the present invention is intended to achieve the above object by the provision of an alignment reference surface on a reflector to which the light source lamp is attached.

More specifically, a light source device of the present invention comprises a light source lamp, and a reflector for reflecting light emitted from the light source lamp, the light source lamp being attached to the reflector, wherein an alignment reference surface for aligning and mounting the light source lamp is formed on the reflector. According to the present invention, the light source device can be assembled by mounting the light source lamp apart from the alignment reference surface by a predetermined distance with respect to, for example, the X-axis, Y-axis, and Z-axis, respectively.

That is, in mounting the light source lamp to the reflector, it is possible to assemble the light source device without fine adjustment of the mounting position of the light source lamp while the light source lamp is lit.

In the present invention, the reflector can be mounted to a lamp housing, and the alignment reference surface may also serve as a mounting reference surface for mounting the reflector to the lamp housing.

With this arrangement, since the alignment reference surface also serves as a mounting reference surface, in assembling a light source lamp unit by mounting the light source device to the lamp housing, an optical lamp is accurately positioned relative to the lamp housing only by pressing the reference surface of the reflector against the lamp housing.

Furthermore, the reflector may be cut out at side surfaces thereof to form an opening surface into a substantially rectangular shape.

With this arrangement, not only a reduction in size of the light source device can be achieved, but also the light source lamp can be attached to the reflector more accurately by using the two sides of the substantially rectangular opening surface that are perpendicular to each other as the alignment reference surface.

Moreover, the reflector may comprise a surface section for covering cutouts formed in the side surfaces thereof, and an edge of the surface section may constitute the alignment reference surface.

With this arrangement, by covering the cutouts with the surface section, even if the light source lamp is broke due to an accident or the like, broken pieces of the light source lamp are blocked by the surface section, whereby the broken pieces are prevented from flying to the outside of the light source lamp unit.

In addition, according to the present invention, the light source lamp unit comprises the above-described light source device, and the lamp housing for mounting thereto the light source device.

Furthermore, according to the present invention, a projection display device is composed of the above-described light source lamp unit, a light valve for modulating light emitted from the light source lamp unit, and a projection lens for enlarging and projecting the light modulated by the light valve onto a projection surface.

Therefore, according to these inventions, it is possible to provide a light source device which can positively arrange a light source lamp at a predetermined position on an optical axis, and to a light source lamp unit and a projection display device.

DESCRIPTION OF THE PREFERRED EMBODIMENTS

An embodiment of the present invention will now be described with reference to the drawings.

FIGS. 1 to 5 show a projection display device 1 according to this embodiment.

Figure 1:
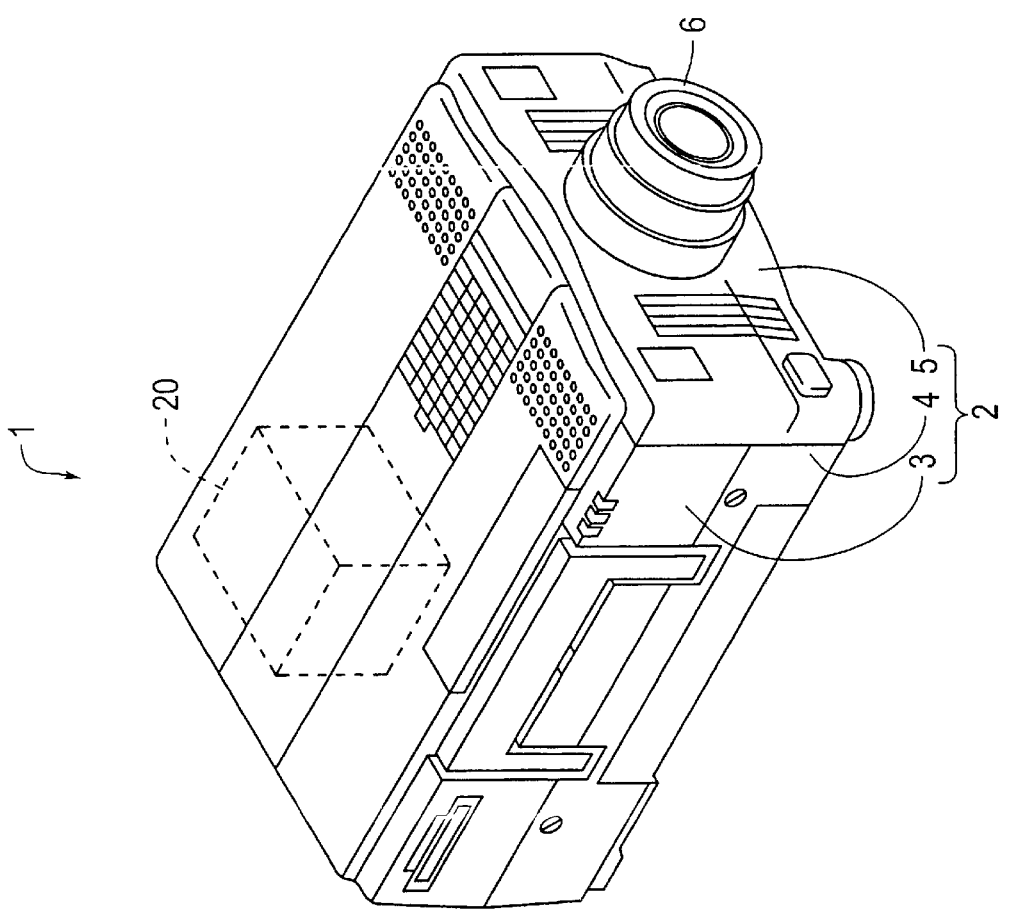
FIG. 1 is a perspective view showing the overall configuration of a projection display device according to an embodiment of the present invention.
Figure 2:
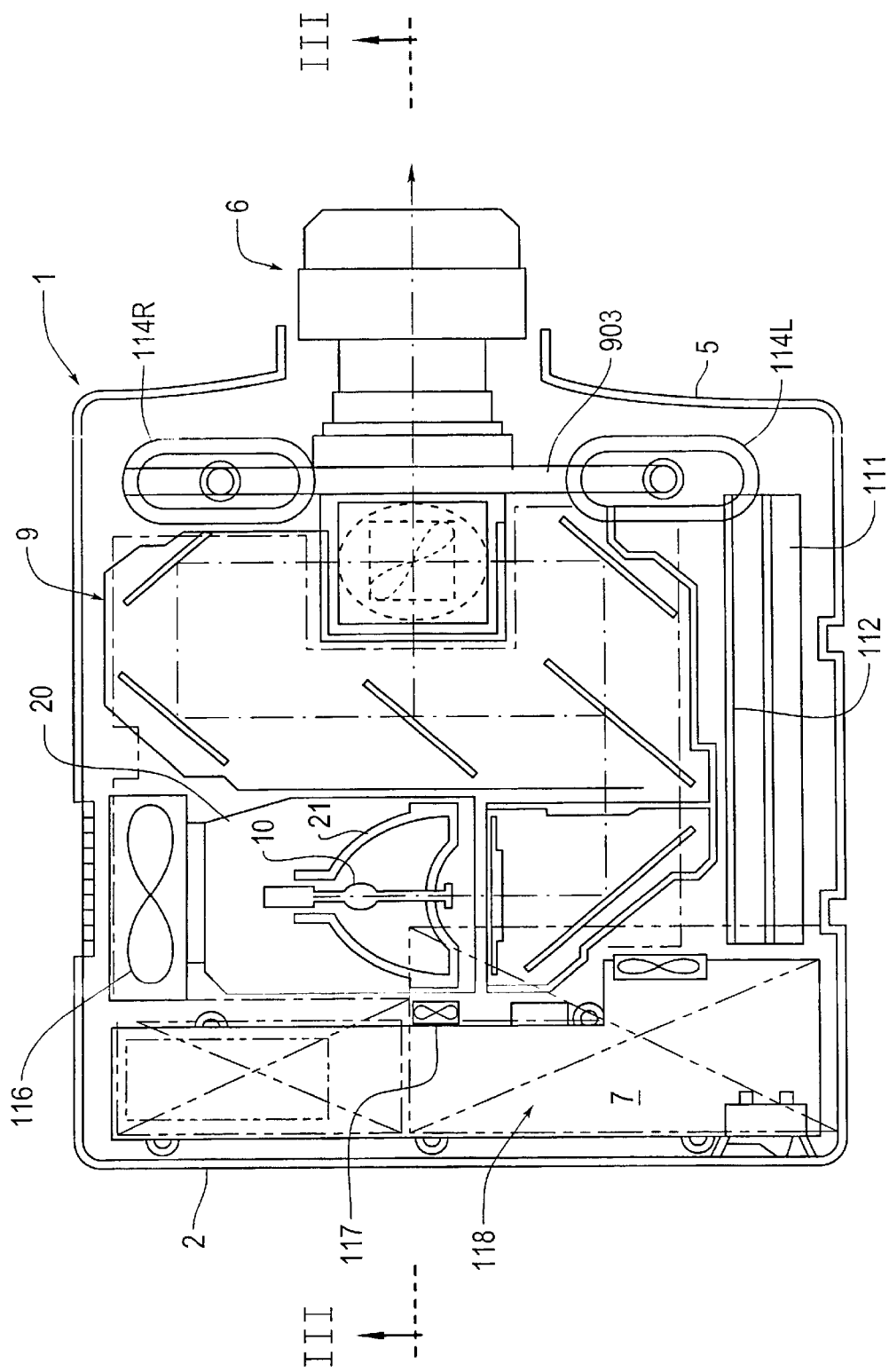
FIG. 2 is a schematic plan view showing an inner configuration of the projection display device.
Figure 3:
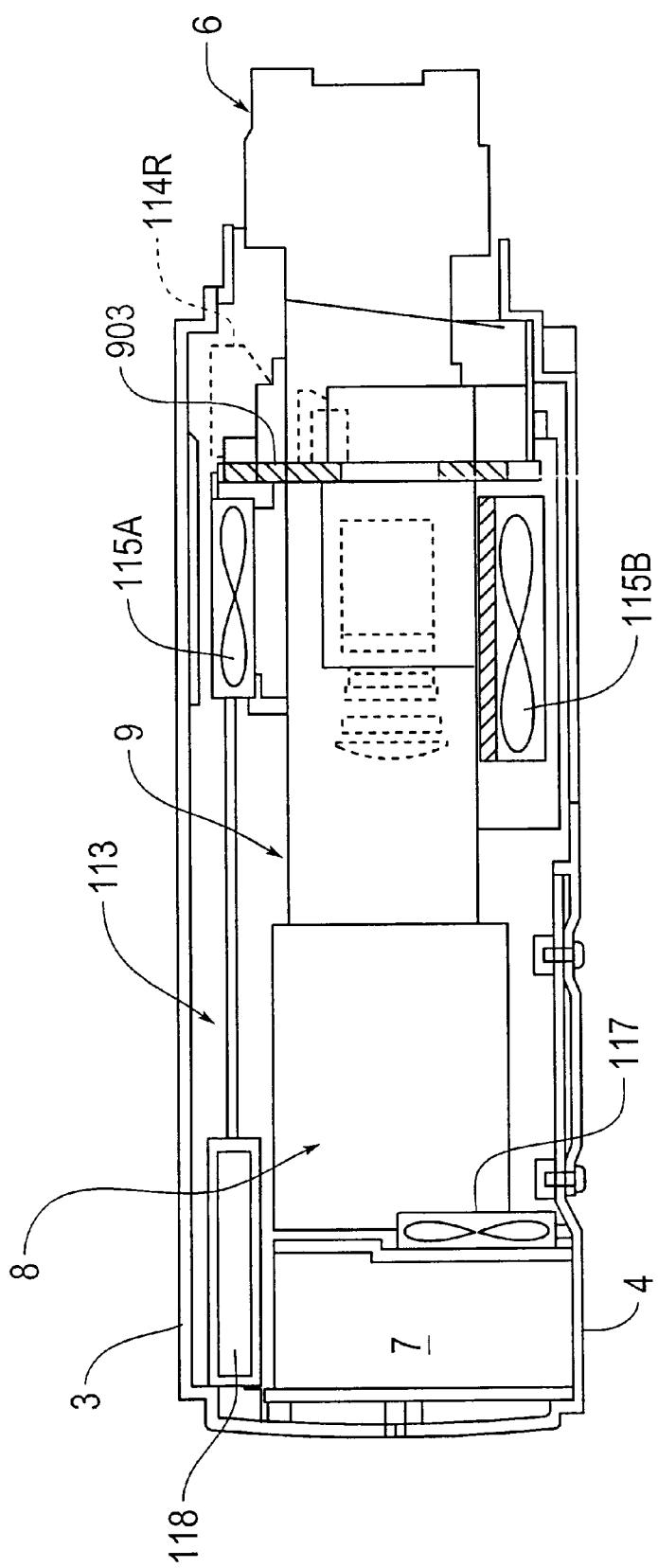
FIG. 3 is a sectional view taken in the direction of the arrows along the line III—III of FIG. 2.

FIG. 1 is a perspective view showing the overall configuration of the projection display device 1, FIG. 2 is a schematic plan view showing an inner configuration of the projection display device 1, and FIG. 3 is a sectional view taken in the direction of the arrows along the line III—III of FIG. 2.

Referring to these drawings, the projection display device 1 comprises an outer casing 2 shaped like a rectangular parallelepiped, a power supply unit 7 arranged inside the outer casing 2, a light source lamp unit 20 arranged adjacent to the power supply unit 7, an optical unit 9 into which a luminous flux emitted from the light source lamp unit 20 can enter substantially along the optical axis, and a projection lens unit 6 arranged on the front center of the optical unit 9.

The outer casing 2 is composed of an upper casing 3, a lower casing 4, and a front casing 5 for defining the front of the device, and the leading end of the projection lens unit 6 protrudes from the center of the front casing 5.

An interface board 111 is arranged on the side of the optical unit 9 so as to extend toward the front and rear of the device, and a video board 112 with a video signal processing circuit mounted thereon is arranged in parallel with the interface board 111.

Moreover, a control board 113 for controlling the operation of the device is arranged above the light source lamp unit 20 and the optical unit 9, and speakers 114R and 114L are arranged at the right and left front corners of the device, respectively. An intake fan 115A for cooling is arranged on the center upper side of the optical unit 9, and a circulating fan 115B for forming a circulating stream for cooling is arranged on the center bottom side of the optical unit 9.

An exhaust fan 116 is arranged on the side of the device, that is, at the rear of the light source lamp unit 20. Moreover, an auxiliary cooling fan 117 for drawing the cooling air stream from the intake fan 115A into the power supply unit 7 is arranged at a position in the power supply unit 7 opposed to the ends of the boards 111 and 112.

A floppy-disk drive unit (FDD) 118 is arranged directly above the power supply unit 7 on the left side of the device.

Figure 4:
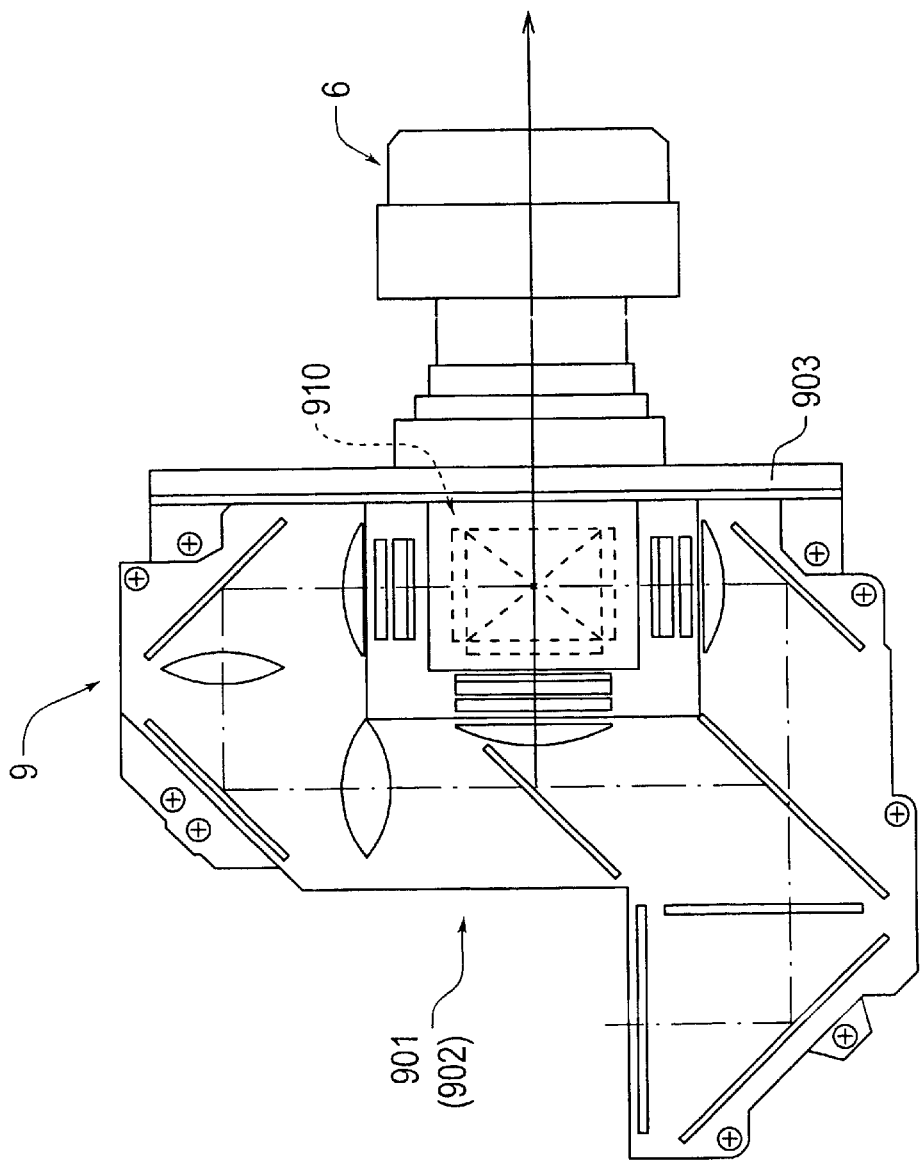
FIG. 4 is a schematic plan view showing only an optical unit and a projection lens unit.

FIG. 4 shows only the optical unit 9 and the projection lens unit 6.

As shown in FIG. 4, in the optical unit 9, optical elements other than a color-synthesizing prism 910 are vertically held between upper and lower light guides 901 and 902. The upper light guide 901 and the lower light guide 902 are fixed by fixing screws on the side of the upper casing 3 and the lower casing 4, respectively. Moreover, these upper and lower light guides 901 and 902 are fixed by fixing screws on the side of the color-synthesizing prism 910. The color-synthesizing prism 910 is fixed by fixing screws on the rear of a thick head plate 903. The base end of the projection lens unit 6 is fixed on the front of the head plate 903 by fixing screws.

Figure 5:
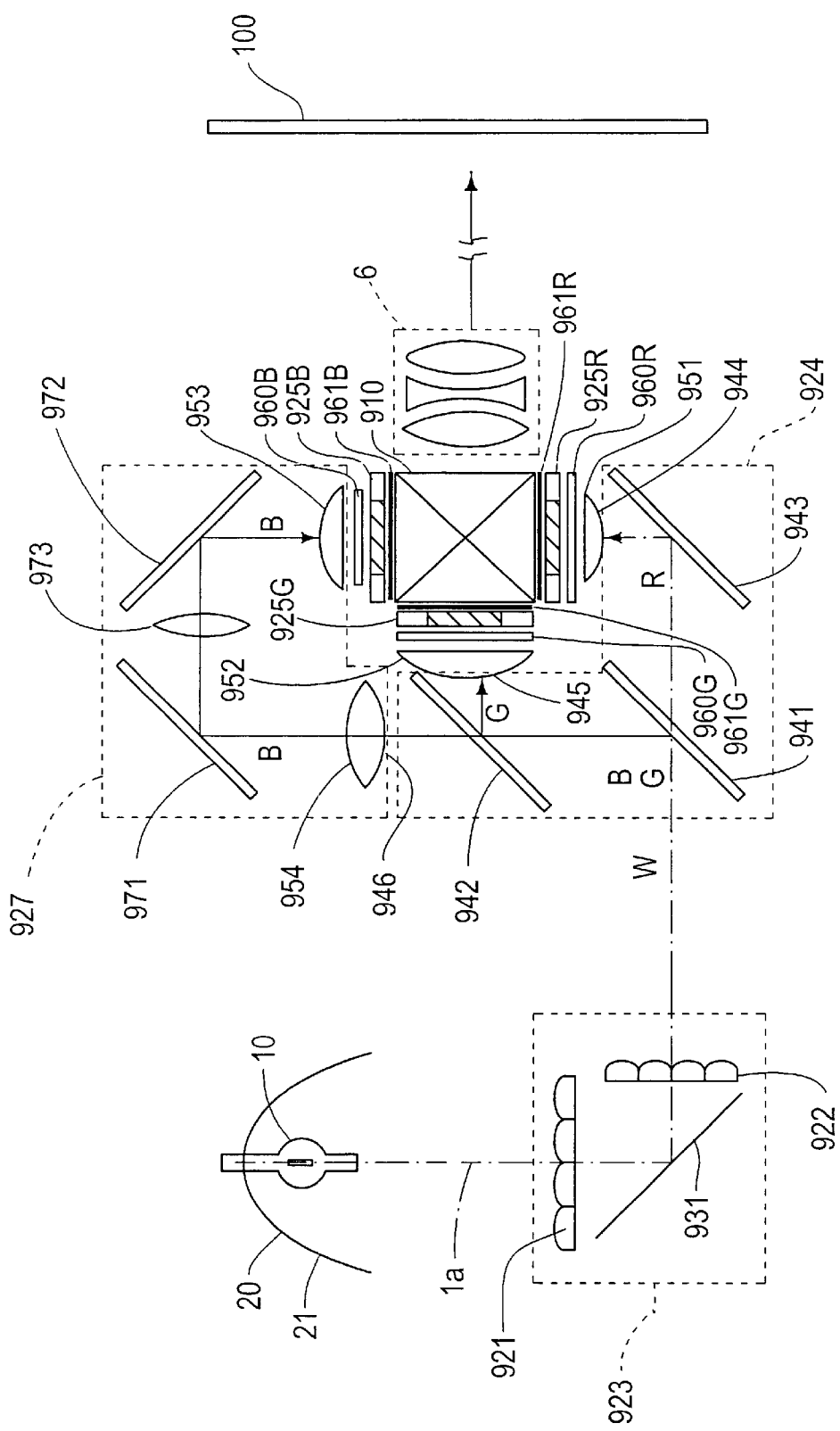
FIG. 5 schematically shows the configuration of an optical system incorporated in the optical unit.

FIG. 5 schematically shows the configuration of an optical system incorporated in the projection display device 1.

Referring to FIG. 5, the optical system in the projection display device 1 uses a light source lamp 10 serving as a component of the light source lamp unit 20, and a uniform-illumination optical system 923 composed of an integrator lens 921 and an integrator lens 922 serving as uniform-illumination optical elements. The projection display device 1 comprises a color separation optical system 924 for separating a luminous flux W emitted from the uniform-illumination optical system 923 into red (R), green (G), and blue (B) fluxes, three liquid crystal light valves 925R, 925G, and 925B, the color-synthesizing prism 910 serving as a color-syntbesizing optical system for re-synthesizing the modulated color luminous fluxes, and a light guide system 927 for guiding the blue luminous flux B to the corresponding liquid crystal light valve 925B in the projection lens unit 6 that enlarges and projects the synthesized luminous fluxes onto the surface of a screen 100.

The uniform-illumination optical system 923 comprises a reflecting mirror 931 so as to bend an optical axis 1a of light emitted from the uniform-illumination optical system 923 by a right angle towards the front of the device. The integrator lenses 921 and 922 are arranged so as to intersect at right angles on both sides of the reflecting mirror 931.

Light emitted from the light source lamp 10 is projected as a secondary light source image via the integrator lens 921 onto the incident surface of each of the lenses that constitute the integrator lens 922, and an object to be illuminated is irradiated with the emitted light from the integrator lens 922.

The color separation optical system 924 is composed of a blue and green reflecting dichroic mirror 941, a green reflecting dichroic mirror 942, and a reflecting mirror 943. The blue luminous flux B and a green luminous flux G contained in the luminous flux W are perpendicularly reflected by the blue and green reflecting dichroic mirror 941, and travel toward the green reflecting dichroic mirror 942. A red luminous flux R passes through the mirror 941, is perpendicularly reflected by the reflecting mirror 943, and is emitted from an emitting section 944 for the red luminous flux R.

Only the green luminous flux in the blue and green luminous fluxes B and G reflected by the mirror 941 is reflected perpendicularly by the green reflecting dichroic mirror 942, and is emitted from an emitting section 945 for the green luminous flux G toward the color-synthesizing optical system. The blue luminous flux B passed through the mirror 942 is emitted from an emitting section 946 for the blue luminous flux B toward the light guide system 927. In this embodiment, all the distances between the emitting section for the luminous flux W of the uniform illuminating optical system 923 and the emitting sections 944, 945, and 946 for each of the color luminous fluxes in the color separation optical system 924 are set to be equal.

Light-collecting lenses 951 and 952 are arranged on the emitting sides of the emitting sections 944 and 945 for the red and green luminous fluxes R and G, respectively, in the color separation optical system 924. Therefore, the red and green luminous fluxes R and G emitted from the emitting sections enter the light-collecting lenses 951 and 952, where they are collimated.

The thus collimated red and green luminous fluxes R and G pass through incident-side polarizers 960R and 960G, respectively, and enter the liquid crystal light valves 925R and 925G, respectively, where they are modulated and given corresponding image information. On the other hand, the blue luminous flux B is guided to the corresponding liquid crystal light valve 925B via the light guide system 927, where it is similarly modulated according to image information. The light valves of this embodiment can use, for example, a polysilicon TFT as a switching element.

The light guide system 927 is composed of a light-collecting lens 954 arranged on the emitting side of the emitting section 946 for the blue luminous flux B, an incident-side reflecting mirror 971, an emitting-side reflecting mirror 972, an intermediate lens 973 arranged between these reflecting mirrors, and a light-collecting lens 953. The blue luminous flux B emitted from the light-collecting lens 953 passes through an incident-side polarizer 960B to enter the liquid crystal light valve 952B, where it is modulated. The blue luminous flux B has the longest optical path length, that is, the distance between the light source lamp 10 and the liquid crystal panel for the blue luminous flux B is the longest, and therefore, the amount of light of the blue luminous flux B to be lost is the largest. The light loss can, however, be restricted by providing the light guide system 927 therebetween.

Then, the color luminous fluxes R, G and B modulated through the liquid crystal light valves 925R, 925G, and 925B, respectively, pass through the emitting-side polarizers 961R, 961G, and 96 1B, respectively, to enter the color-synthesizing prism 910, where they are re-synthesized. A color image synthesized by the color-synthesizing prism 910 is enlarged and projected via the projection lens unit 6 onto the screen 100 located at a predetermined position.

FIGS. 6 to 12 show the light source lamp unit 20 of this embodiment in detail.

Figure 6:
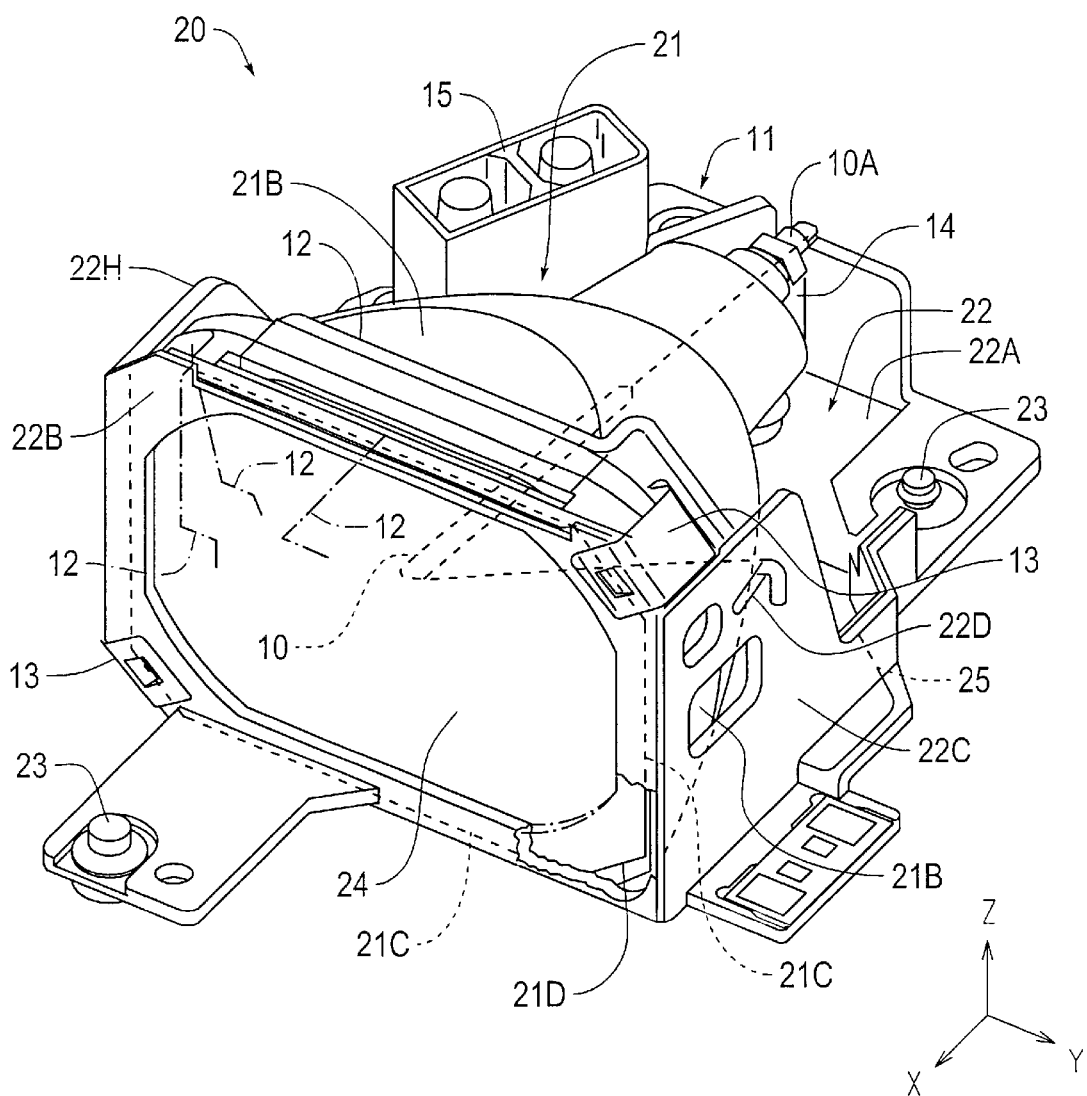
FIG. 6 is perspective view of a light source lamp unit.
Figure 7:
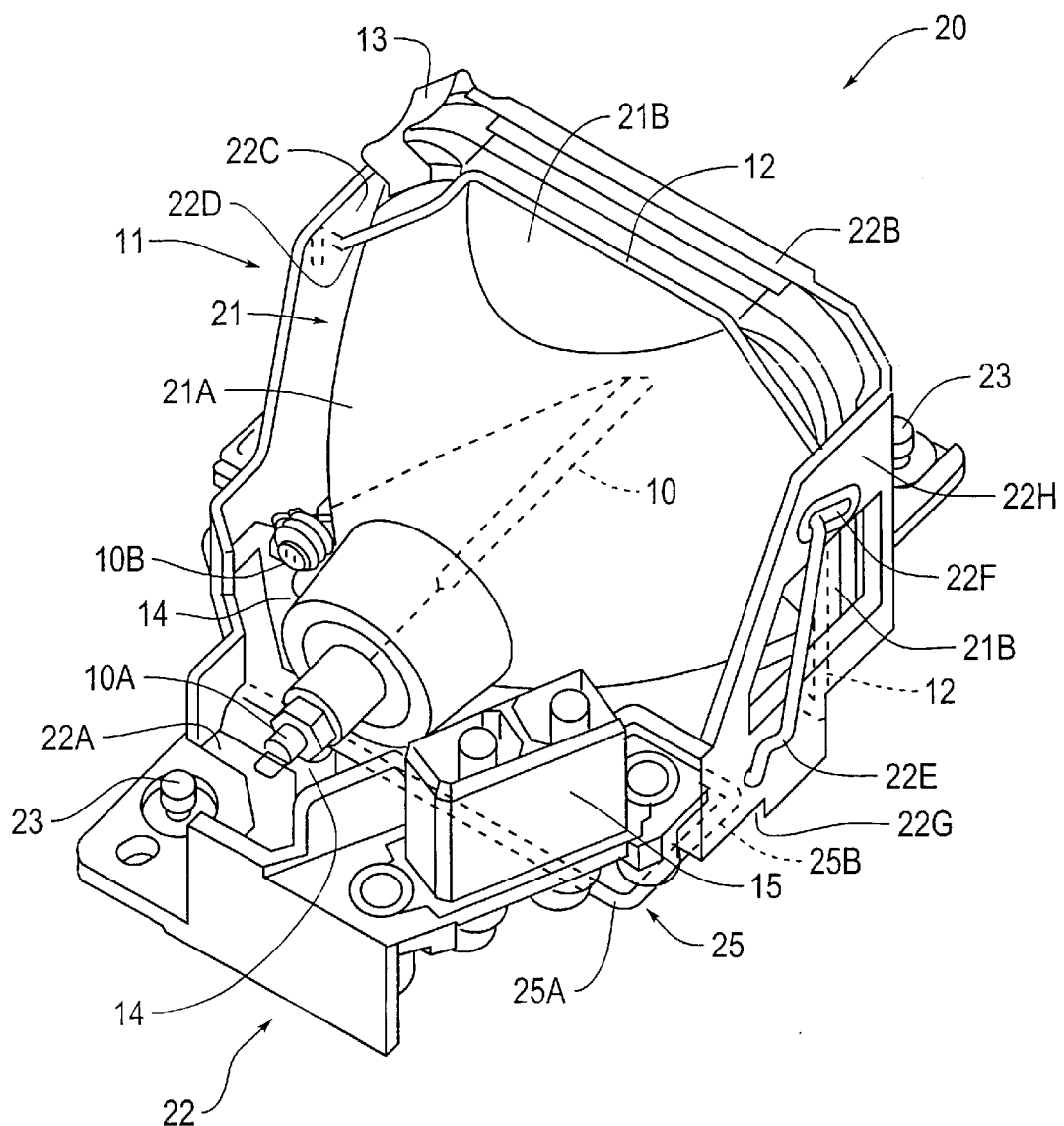
FIG. 7 is a perspective view of the light source lamp unit as viewed from a direction different from that of FIG. 6.
Figure 8:
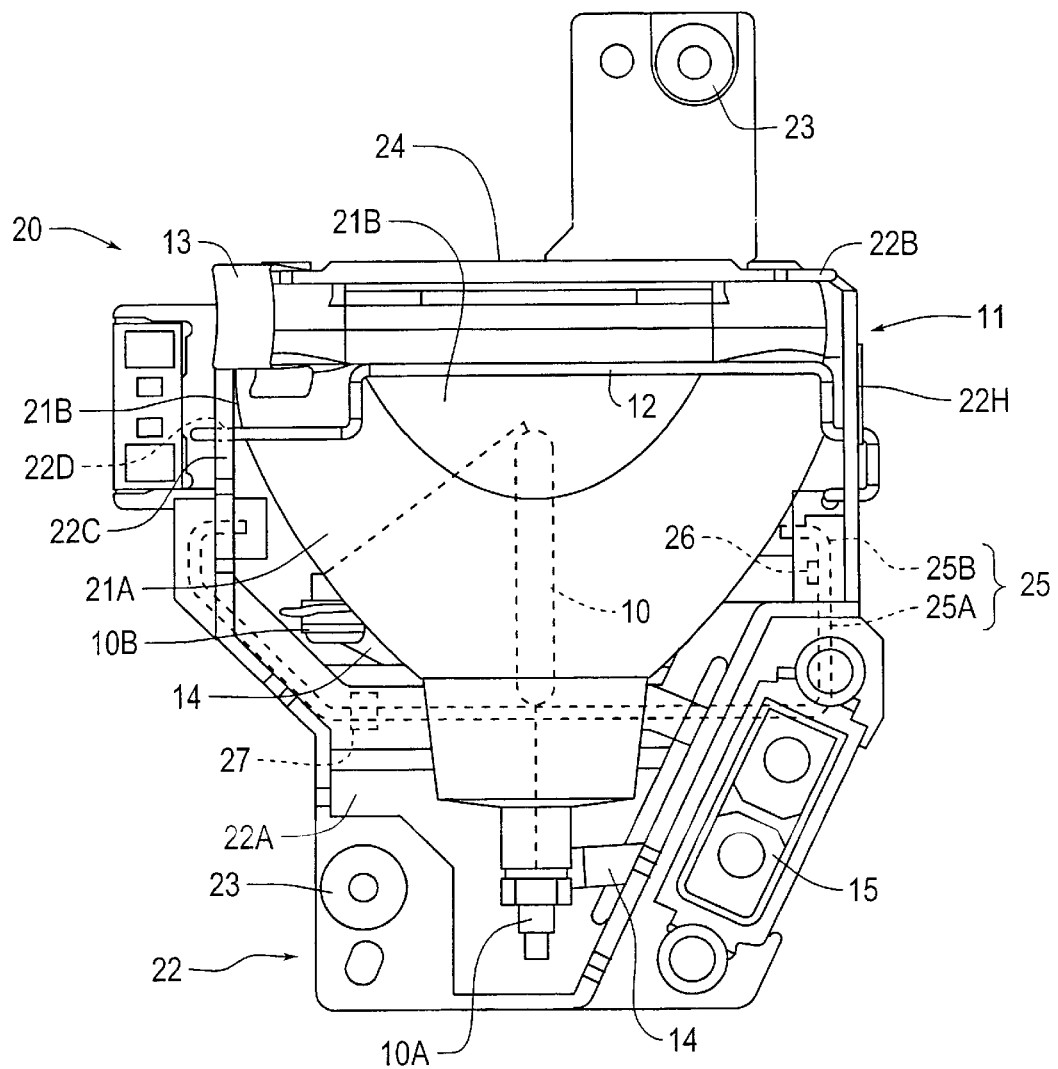
FIG. 8 is a plan view of the light source lamp unit.
Figure 9:
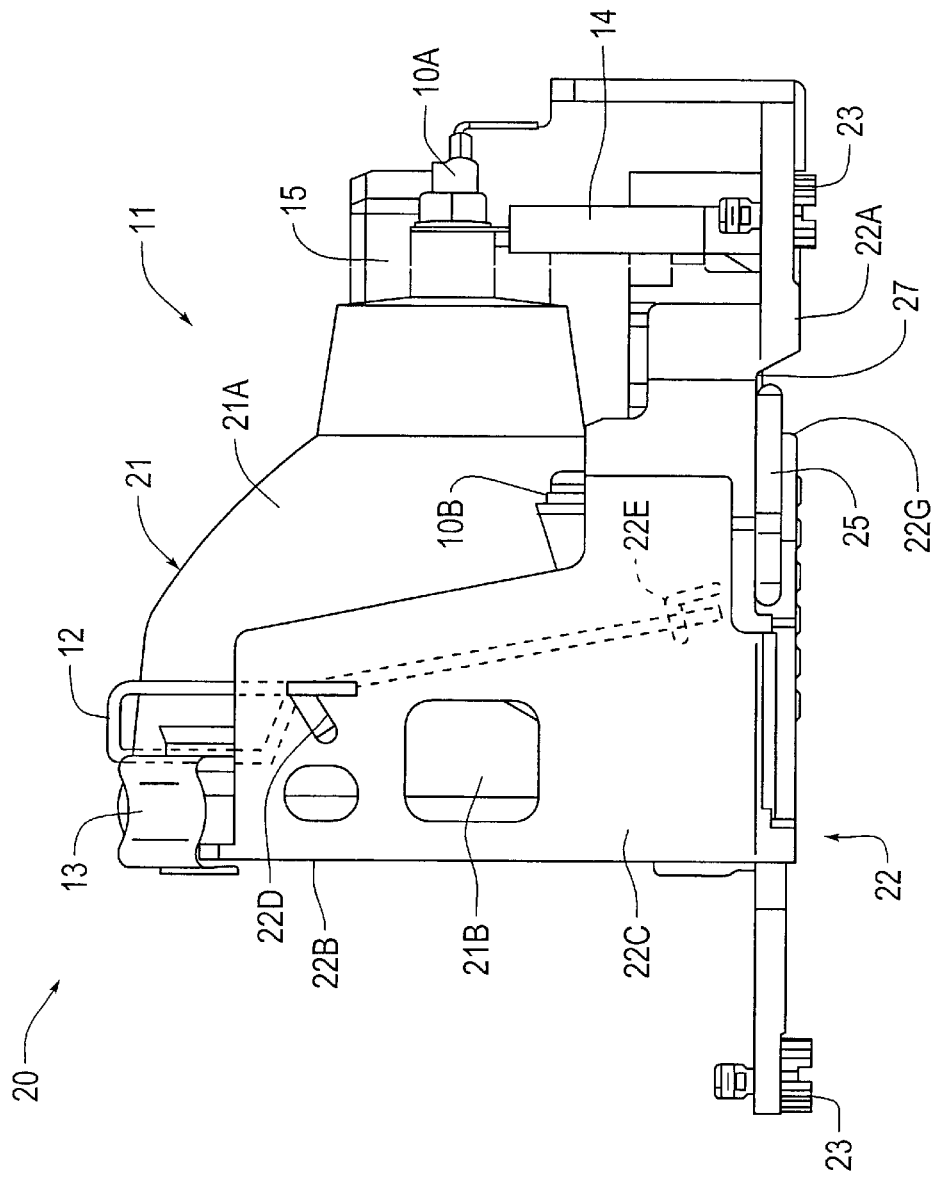
FIG. 9 is a side view of the light source lamp unit.
Figure 10:
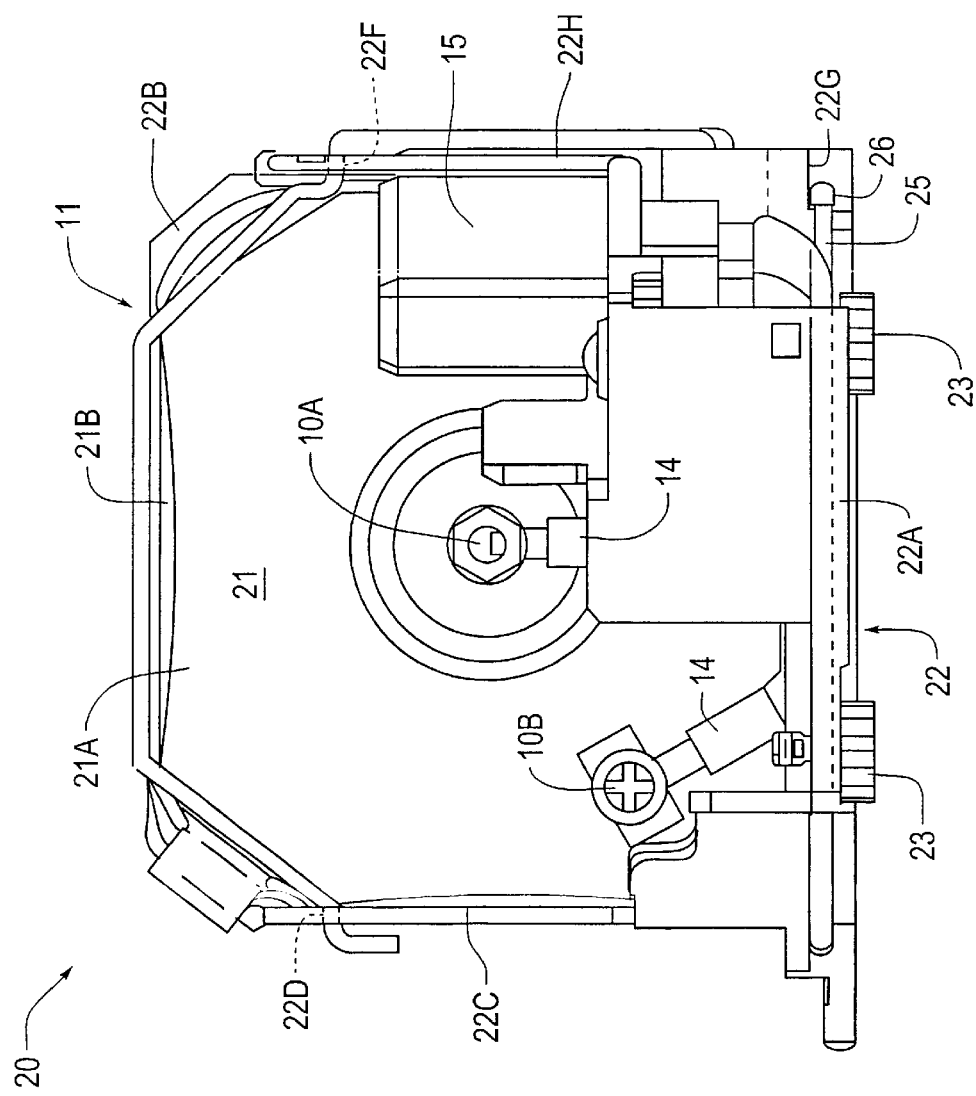
FIG. 10 is a rear view of the light source lamp unit.
Figure 11:
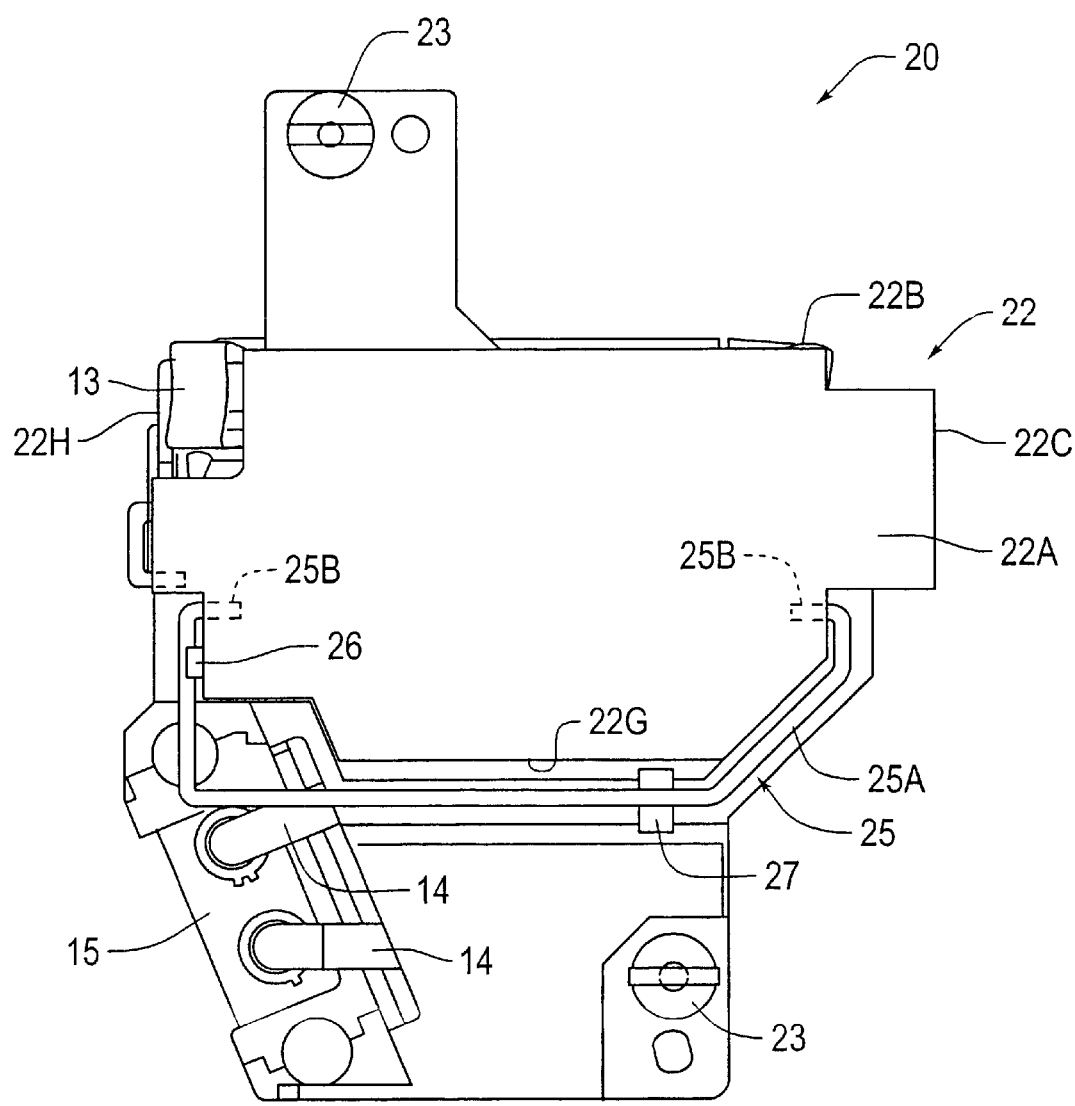
FIG. 11 is a bottom view of the light source lamp unit.

FIGS. 6 and 7 are perspective views of the light source lamp unit 20 as viewed from different directions, FIG. 8 is a plan view of the light source lamp unit 20, FIG. 9 is a side view of the light source lamp unit 20, FIG. 10 is a rear view of the light source lamp unit 20, and FIG. 11 is a bottom view of the light source lamp unit 20.

Referring to these drawings, the light source lamp unit 20 comprises a light source device 11 having the light source lamp 10, and a lamp housing 22 to which the light source device 11 is mounted by a fixing spring 12.

The lamp housing 22 comprises a base section 22A, a first raised section 22B standing in front of the base section 22A, and a second raised section 22C and a third raised section 22H standing on both sides of the base section 22A. The base section 22A is detachably mounted to the outer casing 2 (see FIGS. 1 and 2) by mounting screws 23.

The light source device 11 comprises the light source lamp 10 and a parabolic reflector 21 for enclosing the light source lamp 10 and for reflecting light emitted from the light source lamp 10. An opening surface of the reflector 21 and an abutment section of the lamp housing 22 abutting against the opening surface are fixed by two U-shaped clips 13 serving as auxiliary urging means. These U-shaped clips 13 are arranged on both sides of the axis of the reflector 21. In this embodiment, the clips 13 may be arranged on three corners except the corner on a terminal side.

The light source lamp 10 is a DC-lighting metal halide lamp that comprises an anode core bar and a cathode core bar arranged to oppose each other, molybdenum foils connected to ends of these core bars on the sides not opposing to each other, and a light-emitting tube covering the core bars and molybdenum foils. An AC-lighting metal halide lamp may be used for the light source lamp 10.

The cathode core bar is connected to a low-voltage negative electrode terminal 10A via a lead wire, and the negative electrode terminal 10A is provided on the axis of the light source lamp 10 of the reflector.

The anode core bar is connected to a high-voltage positive electrode terminal 10B via a lead wire, and the positive electrode terminal 10B is provided on the outer peripheral surface of the reflector at a position apart from the negative electrode terminal 10A. In order to achieve a reduction in size of the light source device 11, the front position of the positive electrode terminal 10B is located within a surface of the reflector 21.

A voltage of several tens of kilovolts is applied across both electrode terminals 10A and 10B, the negative electrode terminal 10A is an electrode on the side of a higher voltage, and the positive electrode terminal 10B is an electrode on the side of a lower voltage. These electrode terminals 10A and 10B are connected to ends of lead wires 14, and the other ends of the lead wires 14 are attached to a socket 15 provided in the lamp housing 22.

The reflector 21 comprises a main body 21A whose side surfaces are cut out to form the front of the opening surface into a substantially rectangular shape, and a surface section 21B covering cutouts formed in the side surfaces of the main body 21A, and a protective glass 24 is provided on the front side thereof. An alignment reference surface 21C for aligning and mounting the light source lamp 10 onto the Y-axis and the Z-axis is formed on two adjacent sides of the reflector 21, and an alignment reference surface 21D for aligning and mounting the light source lamp 10 in an X-axis direction is formed in front of the opening of the reflector 21. The opening edge of the surface section 21B constitutes the alignment reference surfaces 21C and 21D.

The alignment reference surfaces 21C and 21D also serve as mounting reference surfaces for mounting the light source device 11 to the lamp housing 22. That is, the alignment reference surface 21C is aligned with the base section 22A and the second raised section 22C of the lamp housing 22, and the alignment reference surface 21D is aligned with the first raised section 22B of the lamp housing 22, whereby the light source lamp 10 is positioned relative to the lamp housing 22.

The fixing spring 12 is arranged on the two sides that are located on the opposite side of the positive electrode terminal 10B across the optical axis of the light source lamp 10 and that are located on the opposite side of the alignment reference surfaces 21C of the reflector 21 so as to be pressed toward the alignment reference surfaces 21C and so that the alignment reference surfaces 21C are pressed against predetermined positions of the lamp housing 22.

The fixing spring 12 is a substantially L-shaped metal wire spring that is engaged with an engaging hole 22D formed in the upper part of the second raised section 22C at an end thereof, is engaged with an engaging hole 22E formed in the lower part of the third raised section 22H at the other end thereof, and is inserted through an insertion hole 22F formed in the upper part of the third raised section 22H at the center thereof.

A handle 25 for taking the light source lamp unit 20 out of the outer casing 2 is provided on the lower surface of the base section 22A, and the handle 25 can be stored in a recess 22G formed in the bottom of the base section 22A. While the handle 25 is made of metal, the lamp housing 22 is formed of an insulating plastic, so that the metal handle 25 is electrically isolated from the positive electrode terminal 10B of the light source lamp 10 by the lamp housing 22 made of an insulating material.

The handle 25 is formed of one elastic linear element comprising a substantially U-shaped handle main body 25A, and journal sections 25B provided on both ends of the handle main body 25A and rotatably supported by the base section 22A.

Projections 26 and 27 for holding the handle main body 25A are formed on the recess 22G formed in the bottom of the base section 22A.

Figure 12:
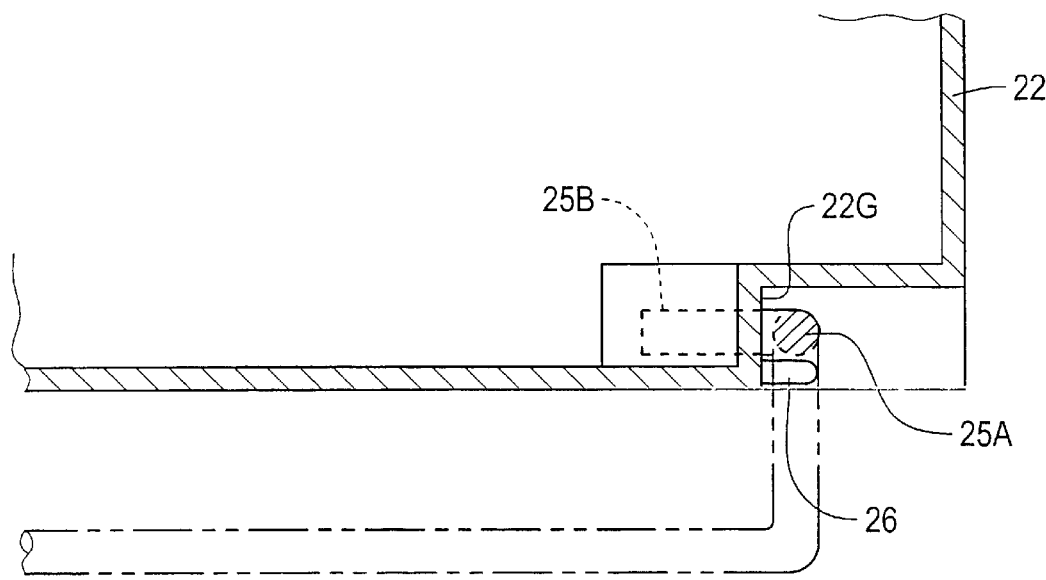
FIG. 12 is a sectional view showing a holding structure near one end of a handle.
Figure 13:
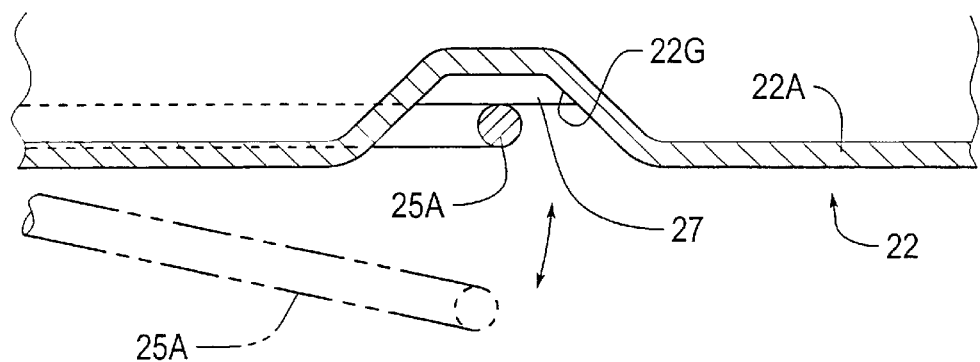
FIG. 13 is a sectional view showing a holding structure near the center of the handle.

A specific structure for holding the handle 25 to the lamp housing 22 is shown in FIGS. 12 and 13. FIG. 12 is a sectional view showing a holding structure near one end of the handle 25, and FIG. 13 shows a sectional view showing a holding structure near the center of the handle 25.

Referring to FIG. 12, the projection 26 is projected from the side surface of the recess 22G, and the upper end thereof can support the handle main body 25A. By rotating the handle main body 25A about the journal sections 25B, the handle 25 is removed from the projection 26 against an elastic force thereof (see the imaginary line).

The journal sections 25B are rotatably supported by bag-like supported sections, thereby blocking an electrical connection between the handle 25 and the electrode terminals 10A and 10B via the base section 22A. While the lamp housing 22 is manufactured by an injection molding method, pins for forming supported sections in an injection molding die are arranged to oppose each other in order to integrally form the bag-like supported sections formed in the base section 22A at positions to oppose each other.

Referring to FIG. 13, the projections 27 are projected from both side surfaces of the recess 22G. The handle main body 25A is clamped by the projections 26 and 27 by the elasticity thereof. This allows the handle 25 to be stored in the recess 22G formed in the base section 22 without rattle. Therefore, in the projection display device having incorporated therein the light source lamp unit, the handle 25 of the light source lamp unit can be prevented from producing resonance by vibrations or sounds. Since the projection 26 is not formed near the other end of the handle 25, the handle main body 25A is held by the projections 26 and 27 at the adjacent two sides. In this embodiment, the handle main body 25A may be held by a total of three projections 26 and 27 by providing only one projection 26 or 27, or projections 26 on both sides.

In the embodiment as described above, the light source lamp 10 is first mounted to the axis of the reflector 21 apart from the alignment reference surfaces 21C and 21D provided on the reflector 21 by a predetermined distance with respect to the X-axis, Y-axis, and Z-axis. Then, the protective glass 24 is attached to the front of the reflector 21 to assemble the light source device 11.

Furthermore, the light source device 11 is mounted to the lamp housing 22 to assemble the light source lamp unit 20. In this assembling operation, the light source lamp 10 is positioned relative to the lamp housing 22 by pressing the alignment reference surfaces 21C and 21D of the reflector 21 against predetermined positions of the lamp housing 22, and then the lamp housing 22 and the light source device 11 are securely fixed by the fixing spring 12 and the U-shaped clips 13. The metal fixing spring 12 is attached on the opposite side of the high-voltage electrode terminal 10B across the optical axis of the light source lamp 10. The fixing spring 12 is placed in a state in which it presses the alignment reference surface 21C of the light source device 11 against a predetermined position of the lamp housing 22.

The thus assembled light source lamp unit 20 is mounted to the outer casing 2 having a component part previously attached thereto, such as the light source unit 7, whereby the assembling operation of the projection display device 1 is completed.

The above-described embodiment offers the following advantages.

That is, the light source device 11 comprises the light source lamp 10, and the reflector 21 for reflecting light emitted from the light source lamp 10, and the alignment reference surfaces 21C and 21D for aligning and mounting the light source lamp 10 to the X-axis, Y-axis and Z-axis are formed on the reflector 21. Therefore, mounting of the light source lamp 10 apart from the alignment reference surface 21C by a predetermined distance with respect to the X-axis, Y-axis, and Z-axis eliminates the need to perform fine adjustment of the mounting position of the light source lamp 10 to the reflector 21 while the light source lamp 10 is lit.

Furthermore, in this embodiment, the reflector 21 can be attached to the lamp housing 22, and the alignment reference surfaces 21C and 21D also serve as mounting reference surfaces for mounting the reflector 21 to the lamp housing 22. Therefore, in assembling the light source lamp unit 20 by mounting the light source device 11 to the lamp housing 22, an optical lamp is accurately positioned relative to the lamp housing 22 only by pressing the reference surface of the reflector 21 against the lamp housing 22, and the light source lamp 10 can be arranged at a predetermined position on the optical axis.

Since the side surfaces of the reflector 21 are cut out to form the front of the opening surface thereof into a substantially rectangular shape, not only a reduction in size of the light source device 11 can be achieved, but also the light source lamp 10 can be attached to the reflector 21 more accurately by using the two sides of the substantially rectangular opening surface that are perpendicular to each other as the alignment reference surface 21C.

Moreover, the reflector 21 comprises the main body 21A and the surface section 21B covering cutouts formed in the side surfaces of the main body 21A, and the edge of the surface section 21B constitutes the alignment reference surface 21C. Therefore, by covering the cutouts with the surface section 21B, even if the light source lamp 10 is broken due to an accident or the like, broken pieces of the light source lamp 10 are blocked by the surface section 21B, whereby the broken pieces are prevented from flying to the outside of the light source lamp unit 20.

In addition, in this embodiment, since the light source lamp unit 20 comprises the light source device 11 having the construction as described above, and the lamp housing 22 for mounting thereto the light source device 11, it is possible to provide the light source lamp unit 20 which can be easily assembled.

In addition, in this embodiment, the fixing spring 12 for fixing the light source device 11 and the lamp housing 22 is arranged on the opposite side of the high-voltage electrode terminal 10B of the light source lamp 10 across the optical axis of the light source lamp 10. Therefore, the electrode terminal 10B and the fixing spring 12 are located at the longest distance from each other, so that electric discharge at the electrode terminal 10B and the fixing spring 12 can be prevented, and the light source lamp 10 can be safely and sufficiently illuminated.

Also, the front of the opening surface of the reflector 21 is formed into a substantially rectangular shape, and the fixing spring 12 is provided on the adjacent two sides of the front of the opening surface of the reflector 21 so as to be pressed towards two sides opposing to the adjacent two sides. Therefore, not only is the light source device 11 securely fixed to the lamp housing 22 by pressing the light source device 11 against the lamp housing 22 by fixing spring 12, but also electric discharge between the electrode terminal 10B and the fixing spring 12 can be positively prevented by arranging the electrode terminal 10B of the light source lamp 10 near the two sides opposing to the adjacent two sides.

Furthermore, since the opening surface of the reflector 21 and the abutment section of the lamp housing 22 abutting against the opening surface are fixed by the U-shaped clips 13 serving as auxiliary urging means, the light source device 11 and the lamp housing 22 can be rigidly fixed to each other.

Also, since the lamp housing 22 is provided with the metal handle 25, and the handle 25 is electrically isolated from the electrode terminal 10B of the light source lamp 10 by the insulating material, i.e., the insulating lamp housing 22 made of plastic, the distance between the electrode terminal 10B and the handle 25 is a creepage distance for insulation, and electric discharge therebetween is difficult to occur.

In addition, the handle 25 comprises the substantially U-shaped handle main body 25A, and journal sections 25B provided on both ends of the handle main body 25A, and projections 26 and 27 are formed on the lamp housing 22. Therefore, the handle 25 can be stored in the lamp housing 22 when not in use and the stored handle 25 is held by the projections 26 and 27 without rattle.

Furthermore, the projection display device is composed of the light source lamp unit 20 constructed as described above, the liquid crystal light valves 925R, 925G, and 925B for modulating light emitted from the light source lamp unit 20, and the projection lens unit 6 for enlarging and projecting the light modulated by the light valves 925R, 925G, and 925B onto the projection surface. Therefore, the light source lamp 10 can be sufficiently illuminated while preventing electric discharge at the electrode terminal 10B and the fixing spring 12, and it is possible to provide the projection display device 1 which can be easily assembled.

The present invention is not limited to the above-described embodiment, and includes other features that can achieve the object of the present invention. The following modifications are also included in the present invention.

For example, while the alignment reference surfaces 21C and 21D also serve as the mounting reference surfaces for mounting the light source device 11 to the lamp housing 22 in the above-described embodiment, mounting reference surfaces for mounting the light source device 11 to the lamp housing 22 may be formed in addition to the alignment reference surfaces 21C and 21D.

Furthermore, while the side surfaces of the reflector 21 are cut out to form the front of the opening surface into a substantially rectangular shape, the opening surface of the reflector 21 may be formed into a shape other than a rectangular shape, such as a circular shape, an elliptic shape, a triangular shape, and a pentagonal shape, and the alignment reference surfaces 21C and 21D may be formed on the opening surface.

In addition, the reflector may have a structure such that the cutouts formed in the side surfaces of the main body 21A are exposed and further, the fixing spring 12 for fixing the light source device 11 and the lamp housing 22 is not necessarily provided. Even if the fixing spring 12 is provided, it is not limited to a wire spring, and it may be, for example, a coiled spring.

What is claimed is:

1. A light source lamp unit, comprising:
   a light source lamp;
   a reflector that reflects light emitted from the light source lamp, the light source lamp being attached to the reflector, the reflector having a main body that reflects light, the main body having an opening on a light-emitting side through which reflected light is transmitted, an outer surface of the light-emitting side of the reflector including a first alignment reference surface that extends in a first direction and a second alignment reference surface that extends in a second direction perpendicular to the first direction;
   a lamp housing to which the reflector is mounted, the lamp housing including a first surface extending in the first direction and a second surface extending in the second direction; and
   a spring that presses the reflector against the lamp housing so that the first alignment reference surface engages the first surface and the second alignment reference surface engages the second surface.

2. The light source lamp unit according to claim 1, wherein an edge of the opening of the reflector includes another alignment reference surface that faces in a third direction perpendicular to the first and second directions.

3. The light source lamp unit according to claim 1, wherein the spring is engaged with the lamp housing.

4. The light source lamp unit according to claim 1, wherein said first and second directions are perpendicular to an optical axis of the reflector.

5. The light source lamp unit according to claim 1, further comprising a U-shaped clip that engages the reflector and the lamp housing and that presses an edge surface of the opening of the reflector against an abutment section of the lamp housing.

6. The light source lamp unit according to claim 5, wherein two or more of the U-shaped clips are arranged around the edge of the opening of the reflector.

7. A projector, comprising:
   the light source lamp unit of claim 1;
   a modulation element that modulates light emitted from the light source lamp unit; and
   a projection lens that enlarges and projects the light modulated by the modulation element.

8. The projector according to claim 7, wherein an edge of the opening of the reflector includes another alignment reference surface that faces in a third direction perpendicular to the first and second directions.

9. The projector according to claim 7, wherein the spring is engaged with the lamp housing.

10. The projector according to claim 7, wherein said first and second directions are perpendicular to an optical axis of the reflector.

11. The projector according to claim 7, further comprising a U-shaped clip that engages the reflector and the lamp housing and that presses an edge surface of the opening of the reflector against an abutment section of the lamp housing.

12. The projector according to claim 11, wherein two or more of the U-shaped clips are arranged around the edge of the opening of the reflector.

13. A light source lamp unit comprising:

a light source lamp;

a reflector that reflects light emitted from the light source lamp, the light source lamp being attached to the reflector, the reflector having a main body that reflects light, the main body having an opening on a light-emitting side through which reflected light is transmitted, an outer surface of the light-emitting side of the reflector including a first alignment reference surface that extends in a first direction, a second alignment reference surface that extends in a second direction perpendicular to the first direction, a third surface parallel to the first alignment reference surface and located on a side of the opening opposite from a side of the opening containing the first alignment reference surface, and a fourth surface parallel to the second alignment reference surface and located on a side of the opening opposite from a side of the opening containing the second alignment reference surface;

a lamp housing to which the reflector is mounted, the lamp housing including a first surface extending in the first direction and a second surface extending in the second direction; and a spring that presses the third and fourth surfaces toward the lamp housing so that the first alignment reference surface engages the first surface of the lamp housing and the second alignment reference surface engages the second surface of the lamp housing.

14. The light source lamp unit according to claim 13, wherein said spring is engaged with the lamp housing.

15. The light source lamp unit according to claim 13, further comprising a U-shaped clip that engages the reflector and the lamp housing and that presses an edge surface of the opening of the reflector against an abutment section of the lamp housing.

16. A projector, comprising:

the light source lamp unit of claim 13;

a modulation element that modulates light emitted from the light source lamp unit; and a projection lens that enlarges and projects the light modulated by the modulation element.

17. The projector according to claim 16, wherein said spring is engaged with the lamp housing.

18. The projector according to claim 16, further comprising a U-shaped clip that engages the reflector and the lamp housing and that presses an edge surface of the opening of the reflector against an abutment section of the lamp housing.

* * * * *